(12) United States Patent
Shang

(10) Patent No.: US 7,062,139 B2
(45) Date of Patent: Jun. 13, 2006

(54) CORE OF AN OPTICAL PATCH CORD AND AN OPTICAL SIGNAL TRANSMISSION SYSTEM USING THE SAME AND A METHOD FOR PREPARING THE SAME

(75) Inventor: Hen-Tai Shang, Hsinchu (TW)

(73) Assignee: Prime Optical Fiber Corporation, Miao-Li (TW)

( * ) Notice: Subject to any disclaimer, the term of this patent is extended or adjusted under 35 U.S.C. 154(b) by 0 days.

(21) Appl. No.: 10/998,607

(22) Filed: Nov. 30, 2004

(65) Prior Publication Data

US 2005/0147369 A1    Jul. 7, 2005

(30) Foreign Application Priority Data

Dec. 3, 2003    (TW) ............................. 92134049 A
Sep. 2, 2004    (TW) ............................. 93126738 A

(51) Int. Cl.
*G02B 6/028*    (2006.01)
(52) U.S. Cl. ........................................ 385/124; 385/141
(58) Field of Classification Search ................ 385/124
See application file for complete search history.

(56) References Cited

U.S. PATENT DOCUMENTS 4,723,828 A * 2/1988 Garel-Jones et al. .......... 385/29

6,154,589 A * 11/2000 Kirk et al. ..................... 385/29
6,356,680 B1    3/2002 Kirk et al.
6,556,329 B1 * 4/2003 Simcoe et al. .............. 398/194
6,718,800 B1 * 4/2004 Mazzarese et al. ........... 65/384
2003/0185530 A1 * 10/2003 White ........................ 385/123

OTHER PUBLICATIONS

"Catalyst 5000 Series Mode-Conditioning Patch Cord Installation Note", Cisco Systems., Text Part No. 1, Jan. 4, 2001.
J.B. Schlager et al., "Annealed Optical Fibre Mode Scrambler" Electronics Letters, vol. 37, No. 1, Jan. 4, 2001.

* cited by examiner

*Primary Examiner*—Sung Pak
(74) *Attorney, Agent, or Firm*—Oliff & Berridge, PLC

(57) ABSTRACT

The present invention discloses a core of an optical patch cord comprising a first end with a refraction index varying in a continuous manner along the radial direction, a second end including a blocking region at a radial center thereof, and a graded region extending from the first end to a predetermined position between the first end and the second end. The graded region has a refraction index distribution varying from the refraction index distribution of the first end to the refraction index distribution of the second end. The present optical signal transmission system comprises a multimode fiber and an optical patch cord including a first segment including a blocking region positioned at a radial center thereof and a second segment connected to the first segment for guiding a light beam into a region outside the blocking region of the first segment.

8 Claims, 9 Drawing Sheets

CORE OF AN OPTICAL PATCH CORD AND AN OPTICAL SIGNAL TRANSMISSION SYSTEM USING THE SAME AND A METHOD FOR PREPARING THE SAME

BACKGROUND OF THE INVENTION (A) Field of the Invention

The present invention relates to a core of an optical patch cord, a method for preparing the same and an optical signal transmission system using the same, and more particularly to a core of an optical patch cord capable of connecting a light source and a multi-mode fiber with optical lossless and without using a precise coupling apparatus, and a method for preparing the same and an optical signal transmission system using the same.

(B) Description of the Related Art

An optical fiber primarily consists of a core and a cladding enclosing the core. The refraction index of the core is higher than that of the cladding, which allows a total reflection to occur when the light beam propagates from dense medium with a high refraction index to loose medium with a relative lower refraction index. Consequently, the light beam can propagate in the dense medium continuously. The optical fiber can be divided into two types: step index fibers and graded index fibers in terms of the refraction index, or single-mode fibers and multimode fibers in terms of the propagation mode.

Due to the great variation of the refraction index at the interface of the core and the cladding of the step index fiber, the light beam from the core to the cladding will be totally reflected at the interface, and the light beam will propagate continuously in the core through the total reflection. The step index fiber has many propagation modes, and each of them delivers optical signals at different speeds, which will result in signal distortions (i.e. diffusion phenomenon) because of different arriving time to the same destination site. The diameter of the core of a single-mode fiber is extremely thin, which just allows the light beam parallel to the central axis to couple into the core; therefore, the arriving time for the light beam to reach the destination point is the same. However, when the emitting spot of the light source is greater than that of the cross-sectional surface of the core of the single-mode fiber, there will be some optical loss because most of the light beam cannot couple into the core.

The refraction index of the core of the graded index fiber is designed to be a parabolic distribution and decrease with the increase of the radius. The propagation speed of the light beam in a medium decreases as the refraction index of the medium increases. A light beam deviating from the central axis propagates in the medium with a lower refraction index, so it propagates at a higher speed but a longer path; while a light beam at the central axis will propagate in a medium with a higher refraction index, so it propagates at a lower speed but a shorter path. Therefore, the time delay between the arriving times of different propagation modes, i.e., differential mode delay (DMD), depends on the refraction index distribution of the core.

FIG. 1 is a cross-sectional view of a core 10 of a graded index fiber and its refraction index distribution as a function of radial position disclosed in U.S. Pat. No. 6,356,680 B1. The preparation of the core 10 first deposits chemical compounds slowly in a glass tube, and the desired distribution of the refraction index can be achieved by controlling the flow rates of deposited chemical compounds such as a reacting gas with germanium. When the chemicals deposited on the inner wall of the glass tube reaches a predetermined thickness, the delivery of the reacting gas is stopped to form a hollow glass rod. The hollow glass rod is then heated and molten to form a solid preform, which will undergo a spinning process to form the core 10. During the heating and melting process, a portion of germanium in the hollow glass rod become germanium oxide, which is gas and escapes into the air. Consequently, an abnormal refracting region 12 is generated at the center of the core 10.

When a laser beam from a single-mode laser source emits into a core such as the core 10 of a multimode fiber, the abnormal refracting region 12 at the center will result in pulse splitting of light signals. Therefore, when connecting a single-mode laser source with the core 10, it is necessary to avoid the launch of the laser beam of the single-mode laser source into the center of the core 10. U.S. Pat. No. 6,356,680 B1 teaches to set an opaque spot at the center of the core 10 to block the laser beam from coupling into the center of the core 10 so as to prevent the laser beam from propagating along the center of the core 10 to reach the light sensor at the destination. Consequently, the laser beam of the single-mode laser source launching into the core 10 at one end can only reach the light sensor at another end by propagating along the region outside the abnormal refracting region 12, and the pulse splitting resulting from the laser beam propagating along the abnormal refracting region 12 will not occur. In addition, U.S. Pat. No. 6,356,680 B1 also teaches that the opaque spot can preferably block 90% of the energy. However, since the opaque spot at the center blocks the laser beam to launch into the core 10, laser beam irradiating on the opaque spot will cause a 90% optical loss.

Another prior art invention for eliminating pulse splitting uses a precise coupling apparatus to connect a single-mode laser source and a multimode fiber. The laser source can only launch its laser beam into a portion of propagation modes of the multimode fiber, and the precise coupling apparatus is used in practice to launch the laser beam into the multimode fiber uniformly along the radial direction, which allows the laser beam to enter all propagation modes of the multimode fiber uniformly to avoid pulse splitting (see: Cisco systems, "Catalyst 5000 Series Mode-Conditioning Patch Cord Installation Note"). As the precise coupling apparatus must be used to assist the alignment of the laser source and the multimode fiber, it is inconvenient in assembly and design. In addition, using the precise coupling apparatus increases the total cost, which does not comply with the industrial demand.

SUMMARY OF THE INVENTION

The objective of the present invention is to provide a core of an optical patch cord capable of connecting a light source and a multi-mode fiber with optical lossless and without using a precise coupling apparatus, and a method for preparing the same and an optical signal transmission system using the same.

In order to achieve the above-mentioned objective, and avoid the problems of the prior art, the present invention discloses a core of an optical patch cord comprising a first end with a refraction index varying in a continuous manner along the radial direction, a second end including a blocking region at a radial center thereof, and a graded region extending from the first end to a predetermined position between the first end and the second end. The graded region has a refraction index distribution varying from the refraction index distribution of the first end to the refraction index distribution of the second end.

The present optical patch cord comprises a first segment including a blocking region positioned at a radial center thereof, and a second segment connected to the first segment for guiding a light beam into a region outside the blocking region of the first segment. The second segment comprises a scattering region positioned at the center of the second segment and a plurality of scattering sites positioned in the scattering region, wherein the scattering sites can be silicon crystals or micro-bubble. In addition, the second segment can also be a step index fiber with a length between 2 and 10 mm.

The present optical signal transmission system comprises a light source, a multimode fiber, and an optical patch cord including a core with a first end connected to the light source and a second end connected to the multimode fiber. The refraction index of the first end varies in a continuous manner along the radial direction and the second end has a blocking region at a radial center.

The present optical signal transmission system may comprise a multimode fiber and an optical patch cord including a first segment including a blocking region positioned at a radial center thereof and a second segment connected to the first segment for guiding a light beam into a region outside the blocking region of the first segment.

The present method for preparing an optical patch cord first prepares a core with a blocking region positioned at a radial center thereof. A thermal treatment is then performed at one end of the core to form a refraction index varying in a continuous manner along the radial direction of the core.

Compared to the prior art, the optical patch cord can be connected to the light source directly without using a precise coupling apparatus, and the assembly and design of the optical patch cord and other optical device is therefore relatively simpler according to the present invention. In addition, no precise coupling apparatus is required to connect the optical patch cord and the light source, so that the present invention can dramatically decrease the total cost of the optical signal transmission system.

BRIEF DESCRIPTION OF THE DRAWINGS

Other objectives and advantages of the present invention will become apparent upon reading the following descriptions and upon reference to the accompanying drawings in which.

DETAILED DESCRIPTION OF THE INVENTION

Figure 1:
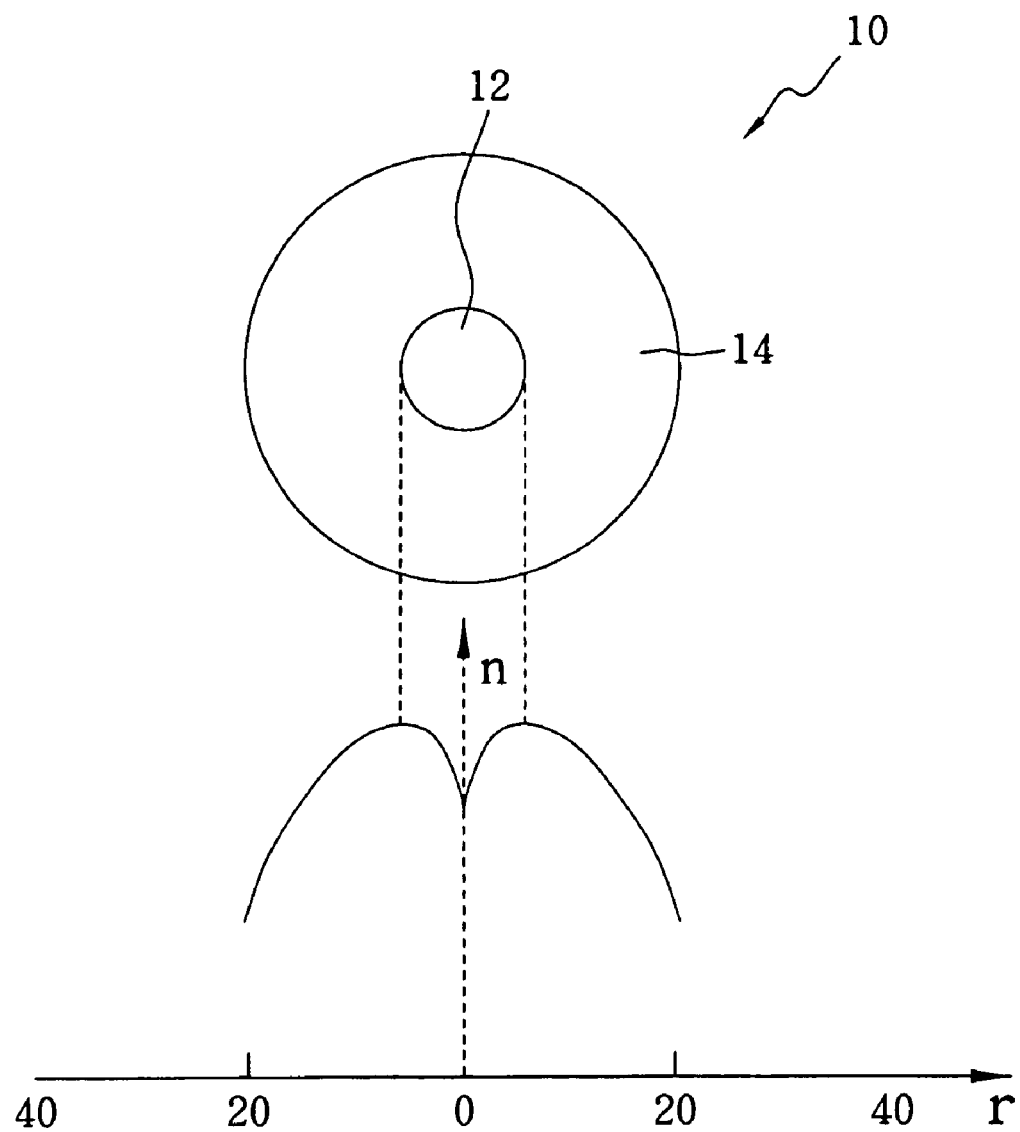
FIG. 1 is a cross-sectional view of a core of a graded index fiber and its refraction index distribution as a function of radial position according to the prior art.
Figure 2:
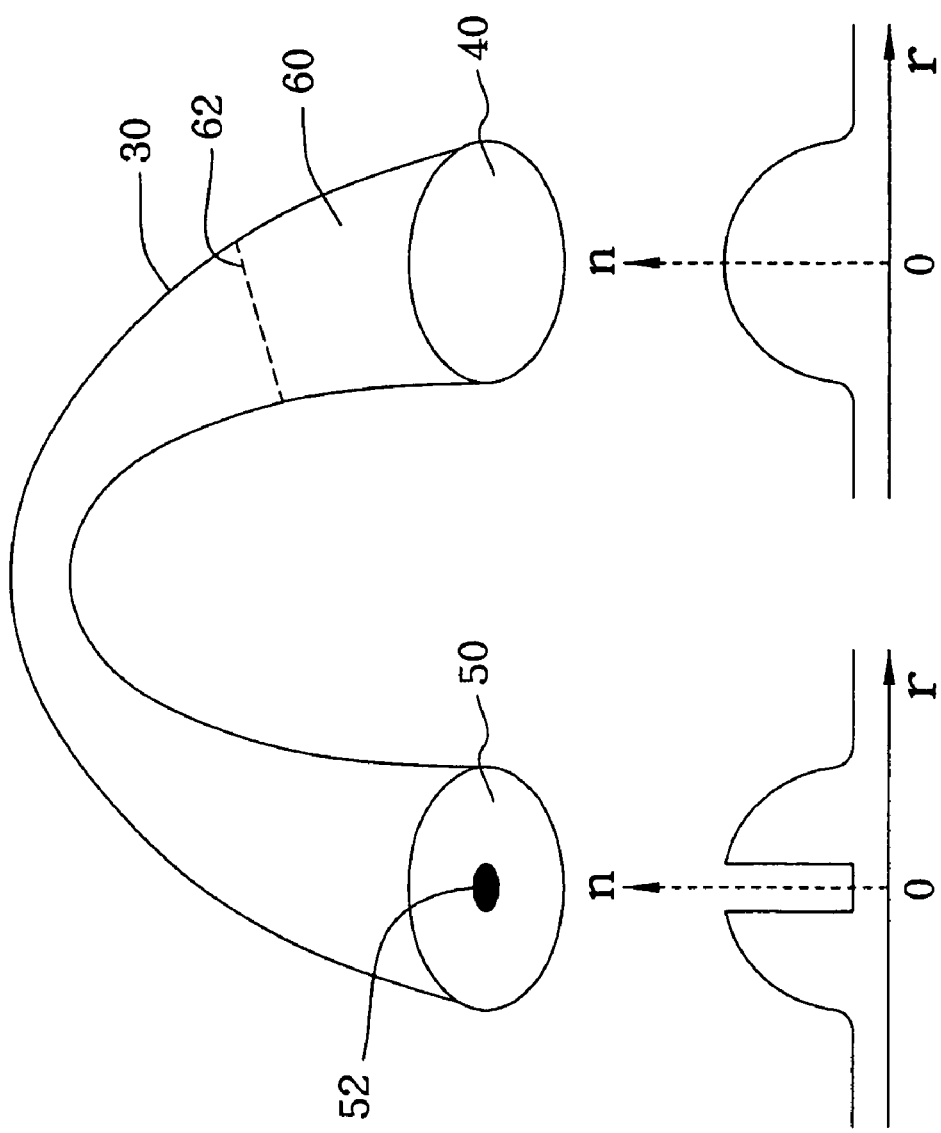
FIG. 2 is a cross-sectional view of a core and its refraction index distribution as a function of radial position according to the first embodiment of the present invention.

FIG. 2 is a cross-sectional view of a core 30 and its refraction index distribution as a function of radial position according to the first embodiment of the present invention. As shown in FIG. 2, the core 30 comprises a first end 40, a second end 50 and a graded region 60 extending from the first end 40 to the second end 50. The refraction index distribution of the first end 40 presents a continuous variation, and it is preferable that the distribution decreases gradually from the center of the core 30 along the radial direction, i.e., the refraction index is maximal at the center. The second end 50 comprises a block region 52 positioned at the center, and its refraction index distribution decreases gradually from the outer edge of the blocking region 52 along the radial direction. The graded region 60 extends from the first end 40 to a predetermined position 62 between the first end 40 and the second end 50, and the refraction index distribution of the graded region 60 varies from the distribution of the first end 40 gradually to that of the second end 50.

Figure 3:
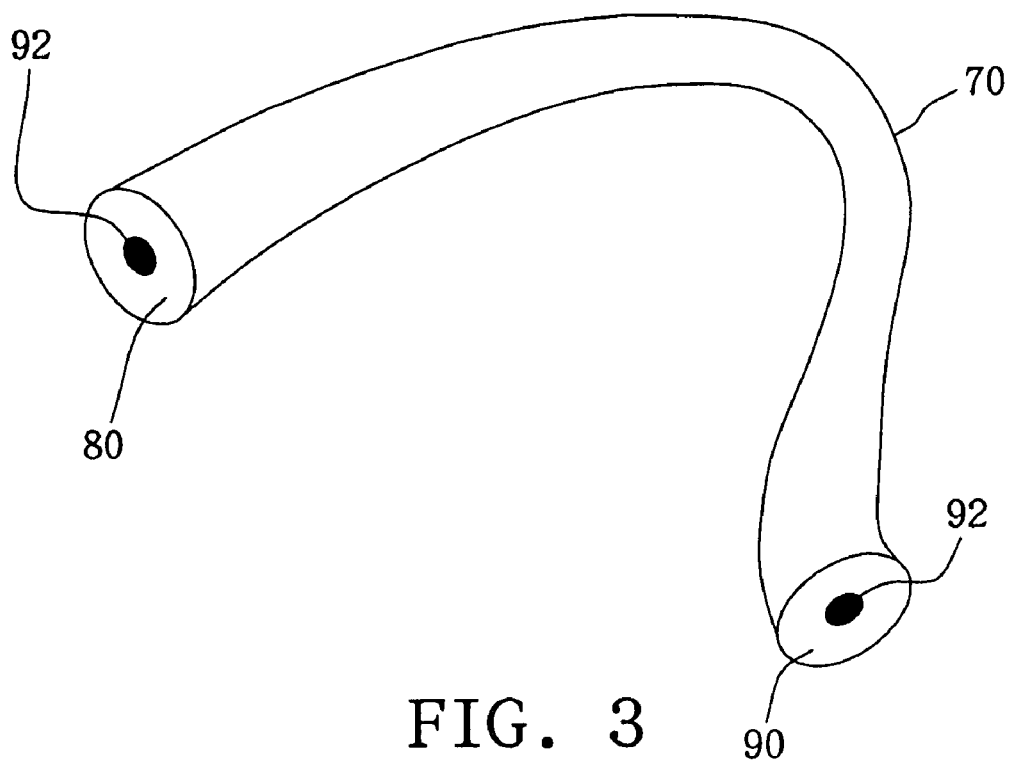
FIG. 3 to FIG. 5 are schematic diagrams showing the preparation of an optical patch cord according to the present invention.
Figure 4:
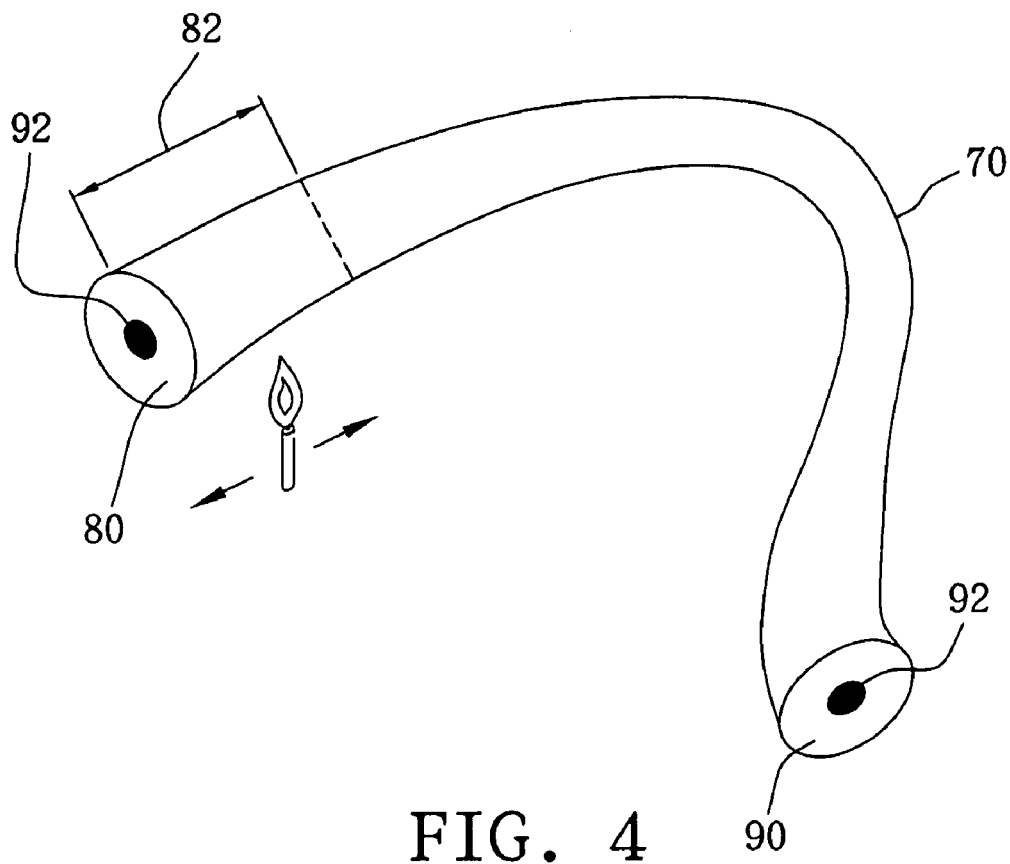
Figure 5:
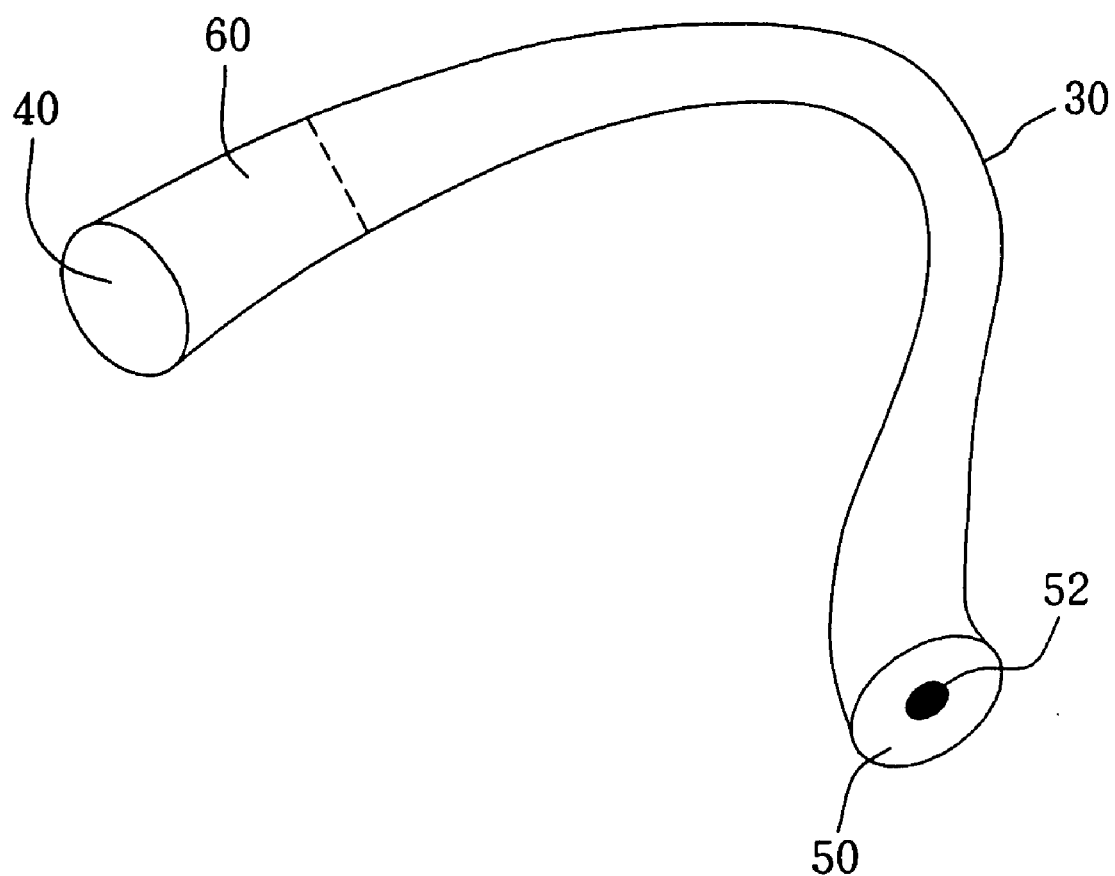

FIG. 3 to FIG. 5 are schematic diagrams showing the preparation of an optical patch cord according to the present invention. As shown in FIG. 3, the present invention first prepares a core 70, which comprises a blocking region 92 positioned at the center. The core 70 is prepared by depositing chemical compounds slowly on an inner wall of a glass tube, and the desired refraction index distribution can be achieved by controlling the flow rates of the reacting gas with germanium. After the chemicals depositing on the inner wall of the glass tube is conducted for a predetermined amount of time, the delivery of the reacting gas with germanium to the glass tube is stopped, while the delivery of other reacting gas is not stopped until the deposition forms a layer with a predetermined thickness. A melting and a fiber spinning process are then performed to complete the core 70 with the blocking region 92.

Referring to FIG. 4, a thermal treatment is performed at a first end 80 of the core 70 to transform the refraction index distribution into a continuous variation. The thermal treatment is performed using a flame traveling around a predetermined range 82 to drive germanium in the core 70 to diffuse into the blocking region 92. The thermal treatment results in a continuous variation of the refraction index distribution at the first end 80, while the refraction index distribution of the predetermined range 82 will vary gradually from the distribution of the first end 80 to that of the second end 90 to complete the preparation for the core 30 (as shown in FIG. 5). Preferably, the refraction index distribution of the core 30 at the first end 40 decreases gradually from the center to the outer edge and is maximal at the center. The exterior of the core 30 will be coated with a cladding to complete the optical patch cord.

Figure 6:
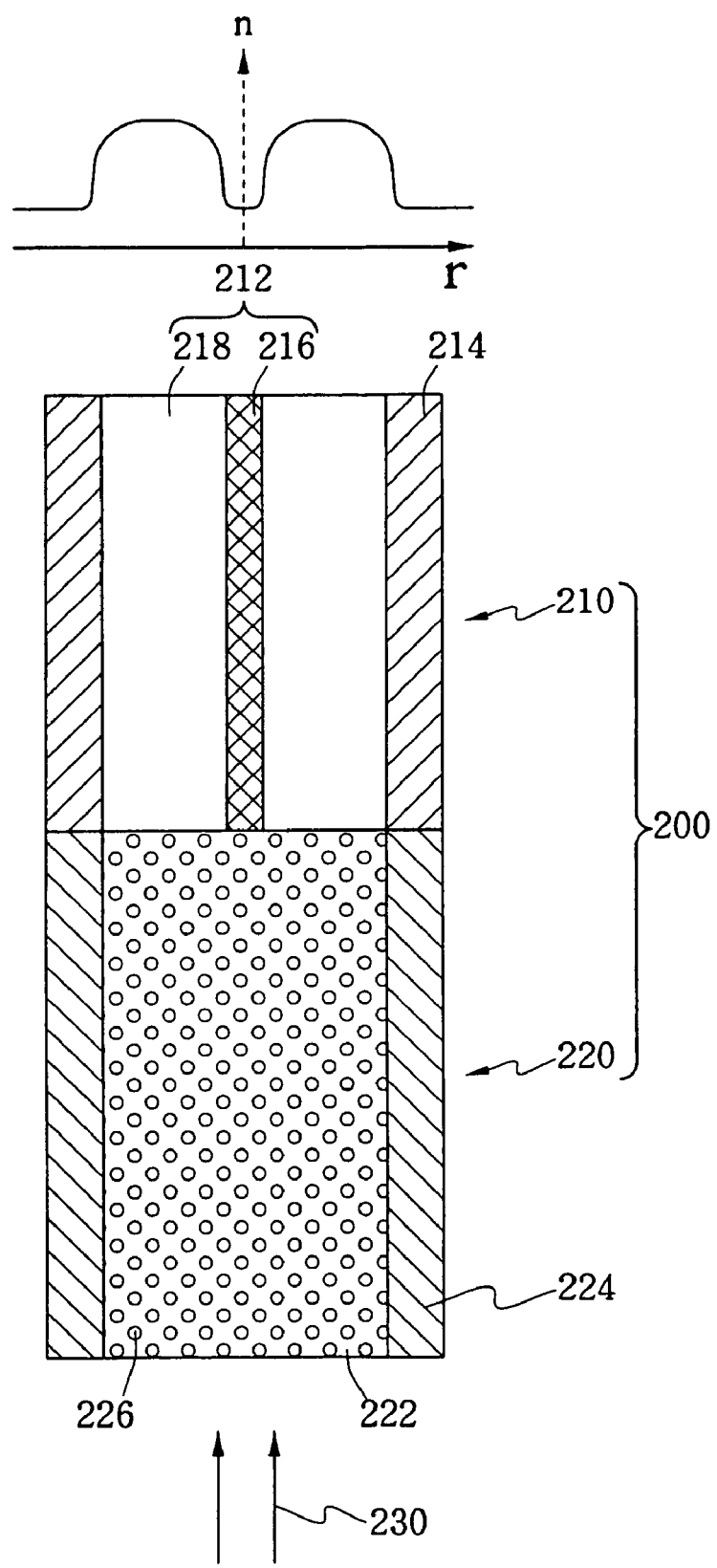
FIG. 6 is a cross-sectional view of an optical patch cord 250 and its refraction index distribution as a function of radial position according to the second embodiment of the present invention.

FIG. 6 is a cross-sectional view of an optical patch cord 200 and its refraction index distribution as a function of radial position according to the second embodiment of the present invention. As shown in FIG. 6, the optical patch cord 200 comprises a first segment 210 and a second segment 220 connected to the first segment 210. The first segment 210 comprises a core 212 and a cladding 214, wherein the core 212 comprises a blocking region 216 at the center and an annular region 218 surrounding the blocking region 216. The second segment 220 comprises a scattering region 222, a cladding 224 and a plurality of scattering sites 226 positioned in the scattering region 222. The scattering sites 226 are silicon crystals or micro-bubbles that can scatter the light beam 230 launching into the scattering region 222 so that the light beam 230 will propagate uniformly into the core 212 of the first segment 210. As a result, most of the light beam 230 is coupled into the region outside the blocking region 216 of the first segment 210, i.e., into the annular region 218 of the first segment 210. Preferably, the length of the second segment 220 is between 2 and 10 mm.

Figure 7:
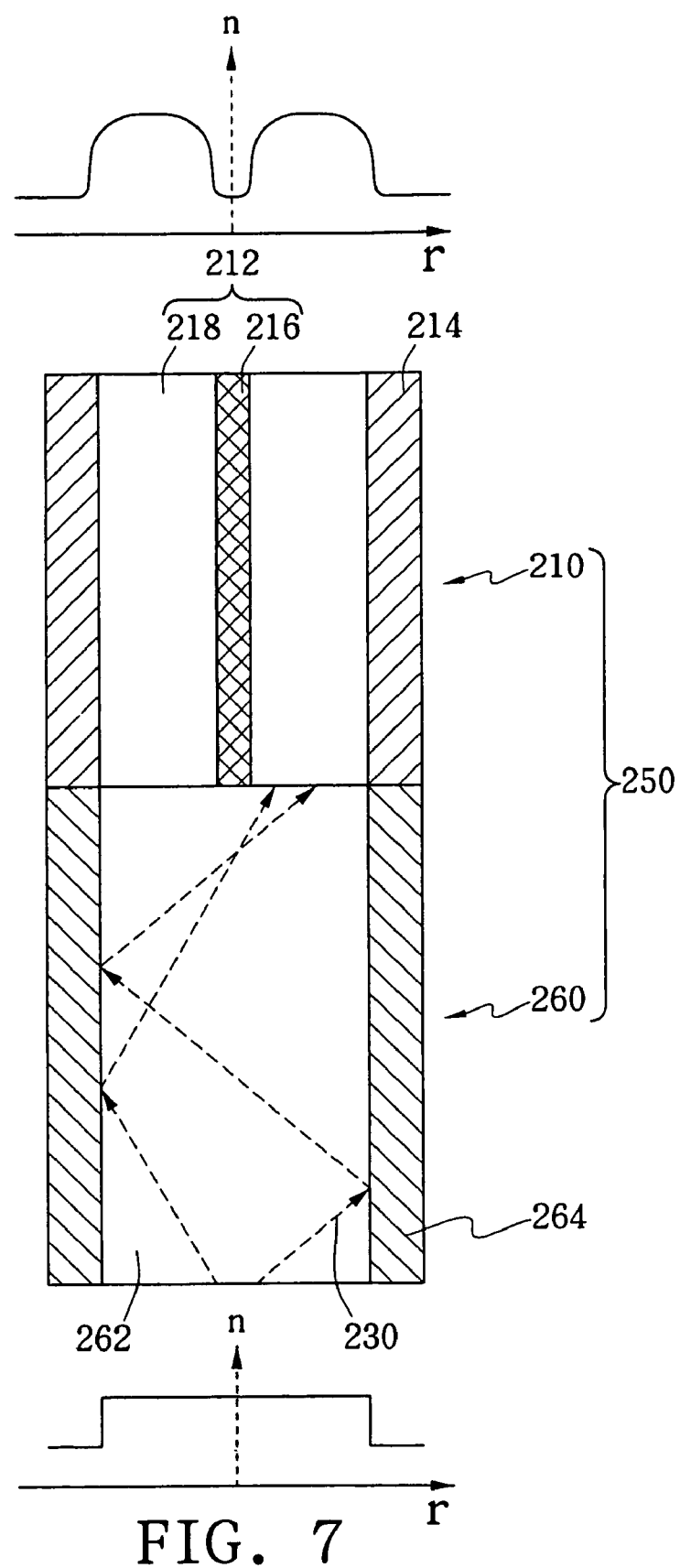
FIG. 7 is a cross-sectional view of an optical patch cord and its refraction index distribution as a function of radial position according to the third embodiment of the present invention.

FIG. 7 is a cross-sectional view of an optical patch cord 250 and its refraction index distribution as a function of radial position according to the third embodiment of the present invention. As shown in FIG. 7, the optical patch cord 250 includes a step index fiber 260 to guide the incoming light beam 230 into the core 212 of the first segment 210 uniformly, wherein the step index fiber 260 comprises a core 262 and a cladding 264. The light beam 230 entering the core 262 will be guided uniformly to a region outside the blocking region 216 of the first segment 210 due to the total reflection at the interface between the core 262 and the cladding 264, i.e., the light beam 230 is guided to the annular region 218 of the first segment 210. Preferably, the length of the step index fiber 260 is between 2 and 10 mm.

Figure 8:
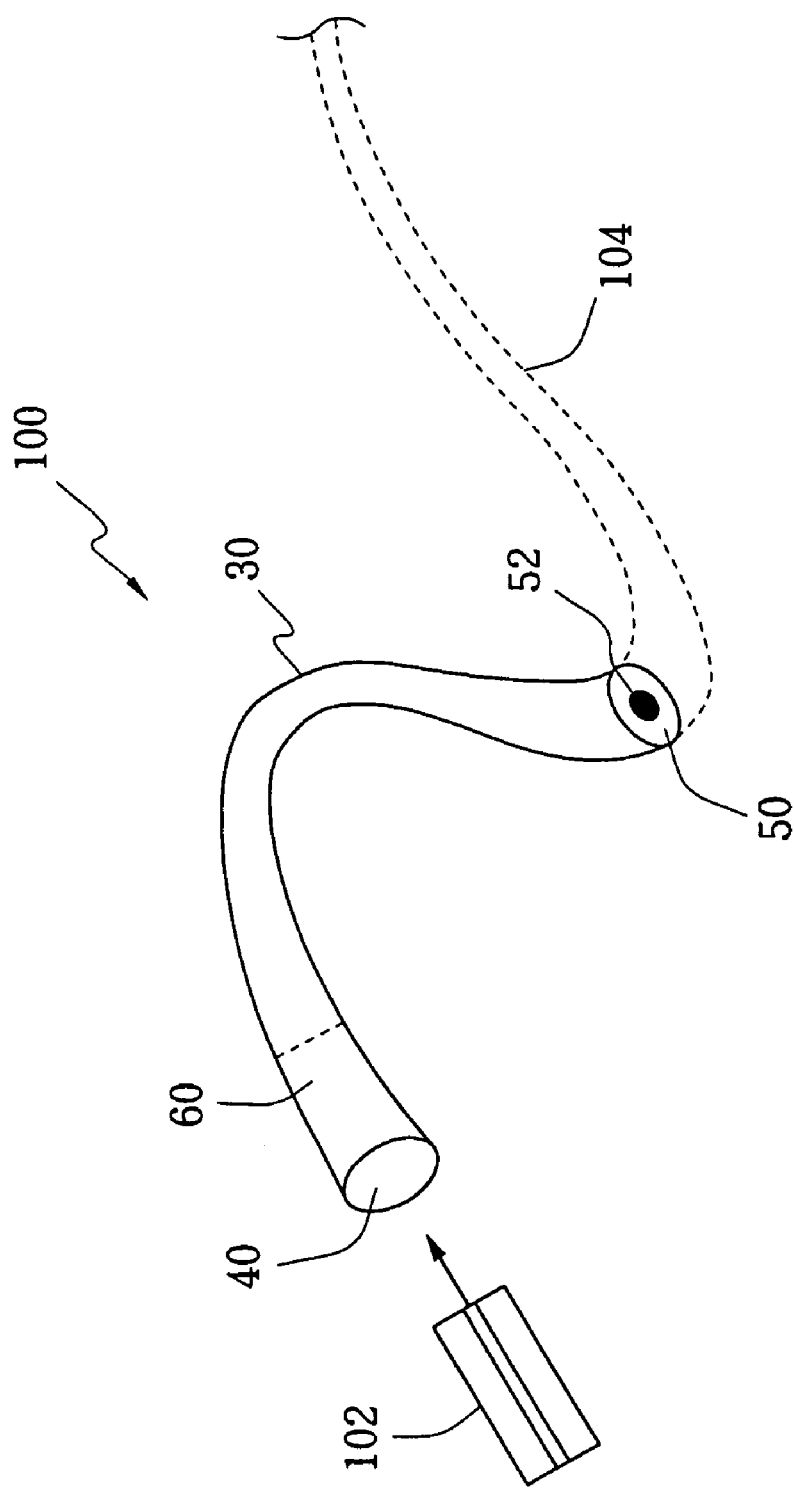
FIG. 8 is a schematic diagram of an optical signal transmission system according to the first embodiment of the present invention.

FIG. 8 is a schematic diagram of an optical signal transmission system 100 according to the first embodiment of the present invention. As shown in FIG. 8, the optical signal transmission system 100 comprises a light source 102, a multimode fiber 104, and an optical patch cord with the core 30 positioned between the light source 102 and the multimode fiber 104, wherein only the core 30 is shown for the purpose of clarity. The core 30 connects the light source 102 at the first end 40 with a refraction index distribution varying in a continuous manner, and connects the multimode fiber 104 at the second end 50 with the blocking region 52 at the center.

The core 30 of the optical patch cord has the graded region 60 with a graded refraction index distribution, and all light beams from the light source 102 enter the graded region 60 at the first end 40. The light beams may undergo several refractions in the graded region 60 and propagate only in the annular region outside the blocking region 52 after leaving the graded region 60. Consequently, when connecting the optical patch cord to the light source 102, it just needs to guide the light beam from the light source 102 to any region of the first end 40 of the core 30, and the graded region 60 will couple and guide all the light beams to the annular region outside the blocking region 52 automatically substantially without any optical loss. Since there is no opaque spot at the first end 40 where the optical patch cord 60 is connected to the light source 102, all the light beams from the light source 102 are fully coupled into the core 30 of the optical patch cord. As a result, connecting the optical patch cord 30 and the light source 102 will be optically lossless according to present invention.

Figure 9:
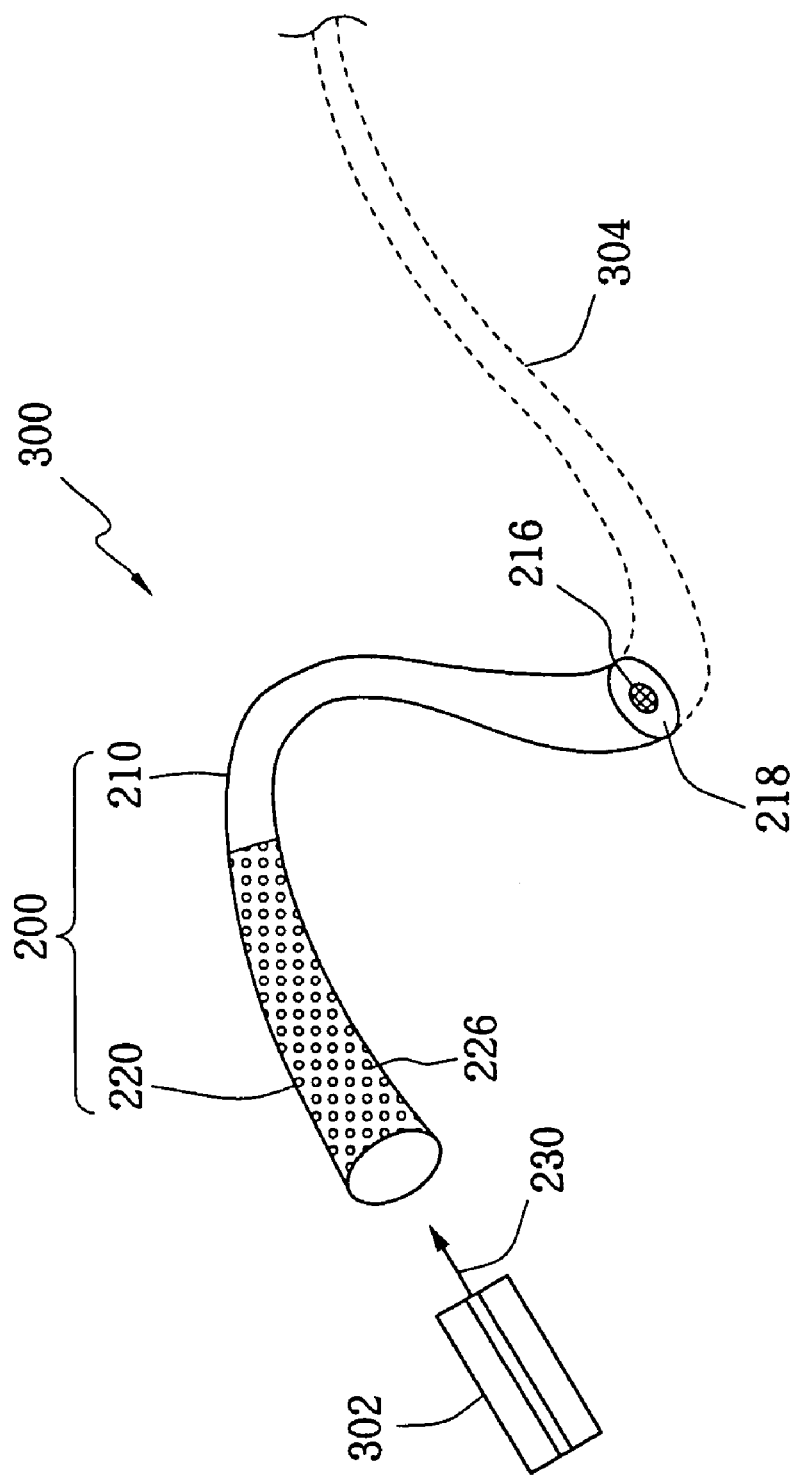
FIG. 9 is schematic diagram of an optical signal transmission system according to the second embodiment of the present invention.

FIG. 9 is schematic diagram of an optical signal transmission system 300 according to the second embodiment of the present invention, wherein only core is shown for the purpose of clarity. As shown in FIG. 9, the optical signal transmission system 300 comprises a light source 302, a multimode fiber 304 and an optical patch cord 200 positioned between the light source 302 and the multimode fiber 304. The optical patch cord 200 comprises a first segment 210 connected to the multimode fiber 304 and a second segment 220 connected to the first segment 210.

The blocking region 216 of the first segment 210 is positioned at the center, while scattering sites 226 of the second segment 220 can guide the light beam 230 from the light source 302 uniformly into the region outside the blocking region 216 of the first segment 210, i.e. into the annular region 218. Consequently, it just needs to guide the light beam 230 from the light source 302 into any area of the second segment 220 according to the present invention, and the scattering sites 226 will guide most of the light beam 230 uniformly into the annular region 218 outside the blocking region 216 of the first segment 210 automatically. As a result, the light beam 230 will propagate in the annular region 218 rather than entering the abnormal refracting region at the center of the multimode fiber 304 when leaving the first segment 210, so that the pulse splitting of optical signal will not occur.

Figure 10:
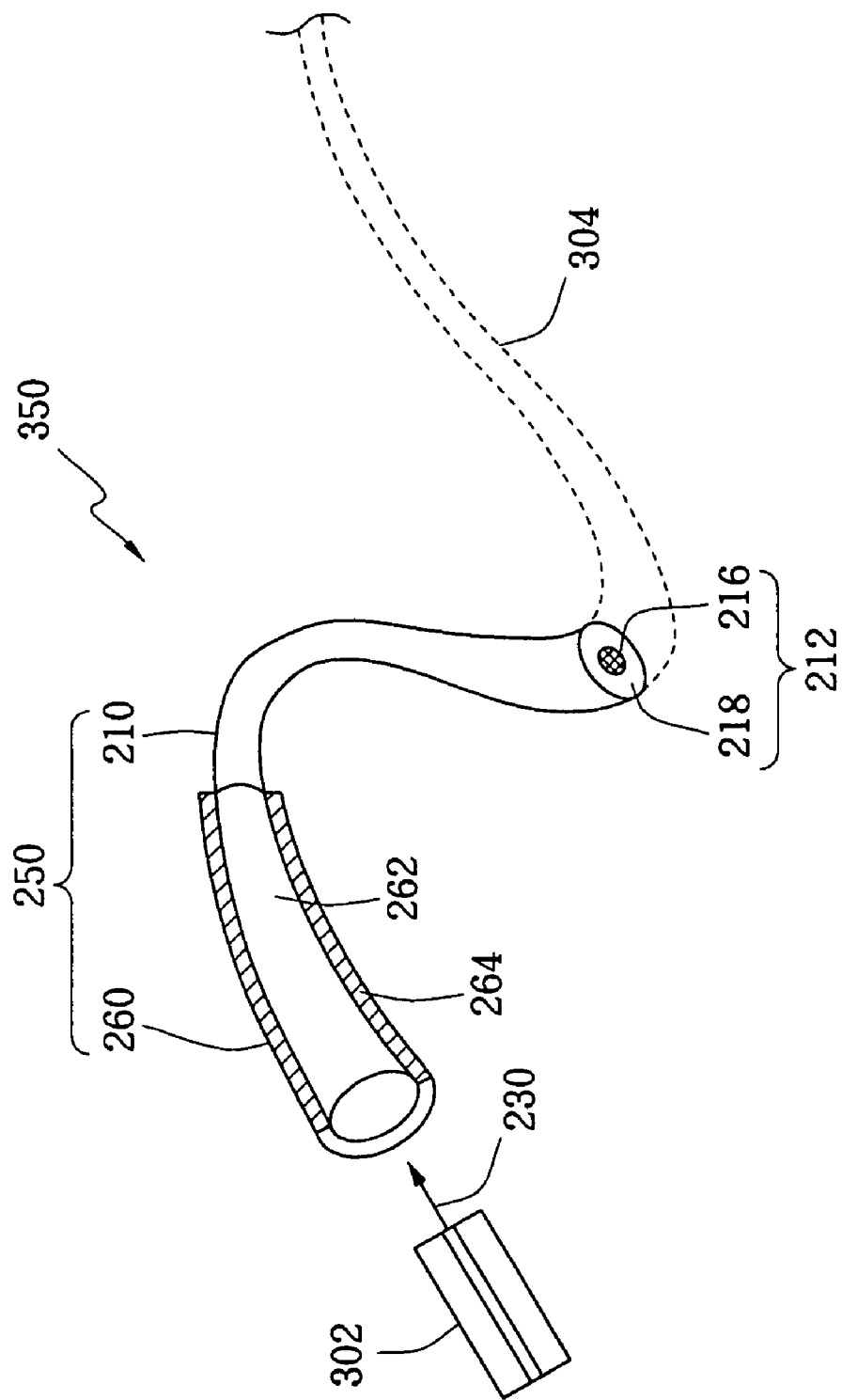
FIG. 10 is a schematic diagram of an optical signal transmission system according to the third embodiment of the present invention.

FIG. 10 is a schematic diagram of an optical signal transmission system 350 according to the third embodiment of the present invention. As shown in FIG. 10, the optical signal transmission system 350 comprises an optical patch cord 250, which uses a step index fiber 260 to guide most of light beams 230 from the light source 302 uniformly into the annular region 218 of the first segment 210 (only core 212 is shown for the purpose of clarity). The light beam 230 entering the core 262 of the second segment 260 will be guided uniformly into the region outside of the blocking region 216 of the first segment 210 due to the total reflection at the interface between the cladding 264 and the core 262, i.e. into the annular region 218. Since the light beam 230 propagates in the annular region 218 rather than entering the abnormal refracting region at the center of the multimode fiber 304 when leaving the first segment 210, the pulse splitting will not occur. Compared to the prior art, the optical patch cord can be connected to the light source directly without using a precise coupling apparatus, the assembly and design of the optical patch cord and other optical device is therefore relatively simpler according to the present invention. In addition, no precise coupling apparatus is required to connect the optical patch cord and the light source, so that the present invention can dramatically decrease the total cost of the optical signal transmission system.

The above-described embodiments of the present invention are intended to be illustrative only. Numerous alternative embodiments may be devised by those skilled in the art without departing from the scope of the following claims.

What is claimed is:

1. A core of an optical patch cord, comprising:
  a first end with a refraction index varying in a continuous manner along the radial direction:
  a second end including a blocking region at a radial center thereof; and
  a graded region extending from the first end to a predetermined position between the first end and the second end, wherein the graded region has a refraction index distribution varying from the refraction index distribution of the first end to the refraction index distribution of the second end.

2. The core of an optical patch cord according to claim 1, wherein the refraction index of the first end decreases along the radial direction.

3. The core of an optical patch cord according to claim 1, wherein the refraction index of the first end is maximal at a radial center.

4. The core of an optical patch cord according to claim 1, wherein the refraction index of the second end decreases from an outer edge of the blocking region.

5. An optical signal transmission system, comprising:
   a light source;
   a multimode fiber; and
   an optical patch cord including a core with a first end connected to the light source and a second end connected the multimode fiber, wherein a refraction index of the first end varies in a continuous manner along the radial direction and the second end has a blocking region at a radial center.

6. The optical signal transmission system according to claim 5, wherein the refraction index of the first end decreases along the radial direction.

7. The optical signal transmission system according to claim 5, wherein the refraction index of the first end is maximal at a radial center.

8. The optical signal transmission system according to claim 5, wherein the core further comprises a graded region extending from the first end to a predetermined positioned between the first end and the second end, and the graded region has a refraction index distribution varying from the refraction index distribution of the first end to the refraction index distribution of the second end.

* * * * *